US010799855B2

(12) United States Patent
Gao et al.

(10) Patent No.: US 10,799,855 B2
(45) Date of Patent: Oct. 13, 2020

(54) ZSM-5 ADDITIVE ACTIVITY ENHANCEMENT BY IMPROVED ZEOLITE AND PHOSPHORUS INTERACTION

(71) Applicant: BASF Corporation, Florham Park, NJ (US)

(72) Inventors: Xingtao Gao, Holmdel, NJ (US); David Hamilton Harris, Mountainside, NJ (US)

(73) Assignee: BASF Corporation, Florham Park, NJ (US)

( * ) Notice: Subject to any disclaimer, the term of this patent is extended or adjusted under 35 U.S.C. 154(b) by 735 days.

(21) Appl. No.: 14/161,851

(22) Filed: Jan. 23, 2014

(65) Prior Publication Data

US 2014/0206526 A1 Jul. 24, 2014

Related U.S. Application Data

(60) Provisional application No. 61/755,509, filed on Jan. 23, 2013.

(51) Int. Cl.
*B01J 29/85* (2006.01)
*B01J 29/00* (2006.01)
*B01J 29/40* (2006.01)
*B01J 37/28* (2006.01)
*C10G 11/18* (2006.01)
*C10G 11/05* (2006.01)

(52) U.S. Cl.
CPC ............. *B01J 29/85* (2013.01); *B01J 29/005* (2013.01); *B01J 29/40* (2013.01); *B01J 37/28* (2013.01); *C10G 11/05* (2013.01); *C10G 11/18* (2013.01); *B01J 2229/18* (2013.01); *B01J 2229/186* (2013.01); *B01J 2229/37* (2013.01)

(58) Field of Classification Search
CPC . B01J 29/005; B01J 29/40; B01J 29/85; B01J 37/08; B01J 2229/18; B01J 2229/186; B01J 2229/37; B01J 27/14; C01G 11/05; C01G 11/18
See application file for complete search history.

(56) References Cited

U.S. PATENT DOCUMENTS

| 2,882,442 | A | 4/1959 | Magnuson et al. |
| 3,130,007 | A | 4/1964 | Breck |
| 3,216,789 | A | 11/1965 | Breck et al. |
| 3,308,069 | A | 3/1967 | Wadlinger et al. |
| 3,442,792 | A | 5/1969 | Eng et al. |
| 3,449,070 | A | 6/1969 | McDaniel et al. |
| 3,972,983 | A | 8/1976 | Ciric |
| 4,310,440 | A | 1/1982 | Wilson et al. |
| 4,331,694 | A | 5/1982 | Izod |
| 4,356,338 | A * | 10/1982 | Young .................... B01J 29/40 208/114 |
| 4,401,556 | A | 8/1983 | Bezman et al. |
| 4,415,438 | A | 11/1983 | Dean et al. |
| 4,440,871 | A | 4/1984 | Lok et al. |
| 4,493,902 | A | 1/1985 | Brown et al. |
| 4,554,143 | A | 11/1985 | Messina et al. |
| 4,567,029 | A | 1/1986 | Wilson et al. |
| 4,666,875 | A | 5/1987 | Pellet et al. |
| 4,678,765 | A | 7/1987 | Chiang et al. |
| 4,701,315 | A | 10/1987 | Wortel |
| 4,742,033 | A | 5/1988 | Harris et al. |
| 4,791,083 | A | 12/1988 | Pellet et al. |
| 4,859,314 | A | 8/1989 | Pellet et al. |
| 4,880,611 | A | 11/1989 | Ballmoos et al. |
| 5,098,684 | A | 3/1992 | Kresge et al. |
| 5,102,643 | A | 4/1992 | Kresge et al. |
| 5,126,298 | A | 6/1992 | Absil et al. |
| 5,171,921 | A | 12/1992 | Gaffney et al. |
| 5,190,902 | A | 3/1993 | Demmel |
| 5,231,064 | A | 7/1993 | Absil et al. |
| 5,366,948 | A | 11/1994 | Absil et al. |
| 5,456,821 | A | 10/1995 | Absil et al. |
| 5,472,594 | A | 12/1995 | Tsang et al. |
| 5,521,133 | A * | 5/1996 | Koermer .................. B01J 21/16 502/208 |
| 5,554,274 | A | 9/1996 | Degnan et al. |
| 5,888,378 | A | 3/1999 | Kowalski |
| 6,037,294 | A * | 3/2000 | Drake ..................... B01J 29/076 502/64 |
| 6,080,303 | A | 6/2000 | Cao et al. |
| 6,355,591 | B1 | 3/2002 | Kuvettu et al. |
| 6,566,293 | B1 | 5/2003 | Vogt et al. |
| 6,916,757 | B2 | 7/2005 | Ziebarth et al. |
| 7,375,048 | B2 * | 5/2008 | Smith ....................... B01J 29/40 502/64 |
| 7,507,685 | B2 | 3/2009 | Ghosh et al. |
| 7,547,813 | B2 * | 6/2009 | Smith ....................... B01J 29/40 585/651 |
| 7,585,804 | B2 * | 9/2009 | Smith ..................... C10G 11/18 502/63 |
| 7,662,737 | B2 | 2/2010 | Ghosh et al. |
| 7,674,942 | B2 | 3/2010 | Ghosh et al. |
| 8,062,987 | B2 | 11/2011 | Ghosh et al. |
| 2002/0049133 | A1 * | 4/2002 | Ziebarth .................. B01J 27/14 502/64 |

(Continued)

FOREIGN PATENT DOCUMENTS

CN 1465527 1/2004
CN 1796494 A 7/2006

(Continued)

OTHER PUBLICATIONS

Sang (Difference of ZSM-5 Zeolites Synthesized with Various Templates, Catalysis Today93-95 (2004), pp. 729-734).*

(Continued)

Primary Examiner — Jun Li
(74) Attorney, Agent, or Firm — Lowenstein Sandler LLP

(57) ABSTRACT

A catalytic additive comprising an intermediate pore zeolite, such as ZSM-5 is treated so as to improve propylene yields when the additive is included in a FCC catalytic inventory by first treating the zeolite with a phosphorus compound to incorporate the phosphorus in the zeolite, and mixing the P-treated zeolite with a matrix component comprising kaolin and another phosphorus-containing compound.

18 Claims, No Drawings

(56) References Cited

U.S. PATENT DOCUMENTS

| 2005/0241995 | A1* | 11/2005 | Smith ..................... B01J 29/06 208/120.01 |
| 2007/0173399 | A1 | 7/2007 | Lau et al. |
| 2008/0161625 | A1 | 7/2008 | Smith et al. |
| 2008/0308455 | A1 | 12/2008 | Long et al. |
| 2010/0256431 | A1 | 10/2010 | Nesterenko et al. |
| 2012/0292230 | A1 | 11/2012 | Long et al. |

FOREIGN PATENT DOCUMENTS

| CN | 1950146 A | 4/2007 |
| CN | 101537365 | 9/2009 |
| CN | 101837301 | 9/2010 |
| JP | 2001517255 A | 10/2001 |
| JP | 2007534485 A | 11/2007 |
| JP | 2008525185 A | 7/2008 |
| RU | 2397811 C2 | 8/2010 |
| WO | 9841595 A1 | 9/1998 |
| WO | WO2001038460 | 5/2001 |
| WO | 2005110597 A1 | 11/2005 |
| WO | 2012-123556 A1 | 9/2012 |

OTHER PUBLICATIONS

English translation of Office Action for Japanese patent application No. 2015-553923 dated Feb. 16, 2018, 9 pages.
English translation of Search Report for Russian Patent No. 2015135445/04 dated Dec. 18, 2017, 24 pages.
Extended European Search Report for European Patent Application No. 14743387.4 dated Aug. 22, 2016, 7 pages.
English translation of Office Action for Chinese patent application No. 201480005695 dated Sep. 15, 2017, 8 pages.
International Preliminary Report on Patentability dated Jul. 28, 2015.

\* cited by examiner

ZSM-5 ADDITIVE ACTIVITY ENHANCEMENT BY IMPROVED ZEOLITE AND PHOSPHORUS INTERACTION

FIELD OF THE INVENTION

The present invention is directed to a catalyst composition for an FCC additive and process for making an FCC additive, which has high efficiency in the production of $C_3$ and $C_4$ olefins, i.e. light olefins.

BACKGROUND OF THE INVENTION

In FCC practice, there are two ways to increase light olefin selectivity. The first of these is to increase the reaction temperature. This will increase the contribution of thermal cracking, which leads to increased formation of lighter products. For instance, in the so-called DCC (Deep Catalytic Cracking) process, a specific type of FCC process, higher temperatures and increased amounts of steam are used. However, thermal cracking is not very selective and produces large amounts of products of relatively little value, such as hydrogen, methane, ethane, and ethylene, in the "wet gas" (which contains $H_2$ and $C_1$-$C_4$ products). Wet gas compression often limits refinery operation.

The second method is to add an olefin-selective, zeolite-containing additive such as a ZSM-5-containing additive to the FCC cracking catalyst, typically containing zeolite Y. Conventional additives usually contain phosphorus-activated ZSM-5, which selectively converts primary cracking products (e.g., gasoline olefins) to $C_3$ and $C_4$ olefins. Improvement of the activity or the selectivity with phosphorus is known to increase the effectiveness of ZSM-5.

An FCC additive containing kaolin and 10-25% by weight ZSM-5 has been used to improve gasoline octane and to enhance LPG yields. To further increase LPG while minimizing unit activity loss due to dilution, additives with ZSM-5 levels greater than 25% are required. Unfortunately, in microsphere additives that contain higher than 25% ZSM-5 levels the attrition resistance of the microspheres becomes an issue.

It is well known that kaolin can be formed into particles, alone or with other ingredients such as particles of zeolitic molecular sieve, to form coherent bodies such as microspheres which, when calcined, are further hardened.

In carrying out various processes in which an aqueous slurry of kaolin is spray dried, it is conventional to disperse the kaolin in the slurry prior to spray drying in order to permit the formation of high solids slurries that are sufficiently fluid to be spray dried. High solids are preferred for economic reasons. Also, higher solids are conducive to the formation of more strongly bonded particles. To disperse kaolin in water, conventional anionic clay dispersants such as sodium condensed phosphate salts, sodium silicates, soda ash, sodium polyacrylate and mixtures thereof are used. Typically, the pH of concentrated dispersed slurries of kaolin are mildly acidic to mildly alkaline, e.g., 6.0 to 8.0, with pH 7 being optimum.

In many catalytic processes, such as FCC processes, the particles must be attrition-resistant as well as sufficiently porous. Generally, one of these qualities is achieved at the expense of the other. For example, as a particle of given chemical composition is formulated to be highly porous, the hardness usually decreases.

U.S. Pat. No. 5,190,902, Demmel, utilizes the addition of phosphoric acid (or other phosphate compounds) with kaolin in a spray drying process to produce spray dried microspheres which are then calcined. In some formulations zeolite particles are present in the spray dryer feed. The process is carried out in one of two basic ways. In one, the slurry of clay particles is brought to a low pH, e.g., 1.0 to 3.0 before being mixed with a source of phosphorus, followed by spray drying. In the other, the clay slurry is brought to a high pH level (e.g., 14.0 to 10.0) before mixing with phosphate-containing compound. According to the teachings of this patent, use of these pH ranges is necessary for the production of particles with superior attrition resistance.

Commonly assigned U.S. Pat. No. 5,521,133 discloses forming improved porous microspheres based on spray dried calcined kaolin. The phosphoric acid and kaolin are pumped in separate streams to a static mixer that is adjacent to the atomizer of a spray dryer. The phosphoric acid is injected into a dispersed high solids kaolin slurry and the slurry is virtually instantaneously atomized into droplets in a spray dryer. The term "virtually instantaneously" as used therein refers to a time less than about 20 seconds, preferably less than about 10 seconds. This spray drying technique eliminates undesirable kaolin flocculation and agglomeration prior to the spray dryer.

Kaolin flocculation and agglomeration prior to the spray dryer would result in relatively large clay particle aggregates in the spray dryer feed. The presence of these large aggregates cause poor and uneven packing of the kaolin particles in the microspheres resulting from the spray drying process. Poor and uneven packing of kaolin particles in microspheres leads to insufficient interparticle binding of the particles within the microspheres. This results in poor physical properties including poor attrition resistance.

In contrast, the process of U.S. Pat. No. 5,521,133 provides microspheres which have good kaolin interparticle binding and excellent physical and chemical properties. For example, microspheres produced by the patented process have high attrition resistance. In addition, the microspheres retain higher porosity than microspheres from the same kaolin that are spray dried without phosphoric acid binder and are calcined to the same temperature. This porosity increase coupled with higher attrition resistance is surprising since, generally, an increase in porosity leads to a decrease in attrition resistance. Sufficient porosity is also important because the physical properties of the microspheres should be comparable to those of microspheres containing the active zeolitic catalytic component, i.e., very low or very high densities are undesirable.

Microspheres prepared by using principles of U.S. Pat. No. 5,521,133 have several applications in FCC including: catalytically inert microspheres having a high attrition resistance; active cracking component (by adding zeolite to the clay slurry); microspheres (with or without added components such as MgO) that preferentially react with contaminant vanadium; microspheres for in-situ zeolite growth (see, for example, U.S. Pat. No. 4,493,902, Brown et al); fluidization additive and catalytic support for a carbon monoxide combustion additive.

As above noted, for propylene production by FCC petrochemical process, the catalyst is composed of a base zeolite Y catalyst for cracking crude oil to lighter products such as gasoline and a ZSM-5 catalyst additive for cracking gasoline olefins. To maximize light olefin production, the ZSM-5 additive desirably has high cracking activity for gasoline range olefin molecules, which may be achieved by improving the P distribution and interaction with ZSM-5 zeolite through phosphorus pre-treatment.

U.S. Pat. No. 6,566,293 & WO01/38460 by Akzo disclose a process to pre-treat ZSM-5 with a phosphorous containing compound (≥10 wt. % $P_2O_5$), followed by calcination at 150-540° C. The P treated ZSM-5 is combined with 10-40% of a catalytic cracking component (Y) to form a bi-functional catalyst that contains both ZSM-5 and Y in the same microsphere.

CN101537365 & CN101837301 by PetroChina describe a hydrothermal process to modify a zeolite (ZSM-5, beta, Y) by a P pre-treatment with an aqueous P solution with pH 1-10 at 70-200° C. for 10-200 min, then filtration, drying and calcination at 200-800° C. for 0.5-10 hr. A catalyst is prepared by combining the 10-60% P pretreated ZSM-5 (or beta) and Y with 10-75 wt. % kaolin and 10-70% alumina.

U.S. Pat. Nos. 7,507,685; 7,674,942; 7,662,737; 8,062,987 by Saudi Basic Industries Corp describe a zeolite catalyst prepared by treating a zeolite with a phosphorus compound to form a P-treated zeolite. The P-treated zeolite is heated to a temperature of 300° C. or higher and then combined with an inorganic oxide binder to form a zeolite-binder mixture. The zeolite-binder mixture is heated to a temperature of about 400° C. or higher to form a bound zeolite catalyst. The binder material is an alumina-containing material.

U.S. 2007/0173399 by Petrobras describes a process to obtain zeolites more resistant to the hydrothermal deactivation in FCC units. The process is characterized by the following steps: (1) forming a low $Na_2O$ zeolite; (2) treating the zeolite at a temperature within the range between 350° C. to 550° C. in the presence of water vapor (≤100% steam) to deposit a phosphorous source in the zeolite followed by drying, with the $P_2O_5$ content between 1% to 10 wt. % on zeolite. A typical example shown in Example 2 indicated that the zeolite was first calcined in an air stream through an oven with varying water vapor content. Afterwards, the steam calcined sample was treated with a solution of ammonium mono-phosphate at 80° C. during 4 hrs, followed by drying and calcination.

U.S. Pat. No. 6,080,303 by Exxon provides a process for improving the catalytic activity of small and medium pore zeolite catalysts. The process comprises the steps of treating a zeolite with a phosphorous compound to form P-treated zeolite and combining the P-treated zeolite with AlPO4. Optionally the P-treated zeolite is calcined.

U.S. 2010/0256431 by Total provides a catalytic olefin cracking process using P-modified zeolite wherein said P-modified zeolite is made by a process comprising the steps: (1) selecting a zeolite (including ZSM-5); (2) steaming at a temperature ranging from 400 to 870° C. for 0.01-200 hr; (3) leaching with an aqueous acid solution containing the source of P at conditions effectively to remove a substantial part of Al from the zeolite and to introduce at least 0.3 wt. % of P; (4) separation of the solid from the liquid; and optionally washing step or an optional drying step or an optional drying step followed by a washing step; (4) a calcination step.

SUMMARY OF THE INVENTION

The present invention provides a process for improving the catalytic activity of a ZSM-5 additive which comprises the steps of treating the ZSM-5 zeolite with a phosphorus compound to form a phosphorus treated zeolite and combining the phosphorus treated zeolite with kaolin and a phosphorus compound. The phosphorus treated zeolite is calcined at a temperature below 650° C. in 0-100% steaming environment, prior to combining with kaolin. The ZSM-5 additive, when combined with cracking catalysts, is particularly useful for propylene production by a fluidized catalytic cracking process.

The P-treated ZSM-5, kaolin, optionally reactive alumina and a high density compound, are formed into a slurry and the slurry and phosphorus compound are either mixed together prior to the spray drier or pumped in separate streams to a static mixture adjacent to the atomizer of a spray dryer. Thus, in the latter case, the phosphorus compound is injected into the dispersed high solids mixed kaolin slurry and the phosphorus-injected slurry is atomized into droplets in a spray dryer, wherein the contact time of the phosphorus compound and ZSM-5/kaolin alumina slurry is less than 30 seconds. The process provides microspheres which have good kaolin interparticle binding and excellent physical and chemical properties. Moreover, the microspheres can contain at least 25 wt. % ZSM-5 and due to the addition of the unreactive alumina or other high density, unreactive inorganic material, have high attrition resistance.

DETAILED DESCRIPTION OF THE INVENTION

FCC catalysts are often blends of microspheres containing a catalytically active component (microspheres containing zeolite Y) and additives (microspheres composed of highly calcined kaolin with low surface area, with and without zeolite, such as ZSM-5). During the process of fluid cracking, the catalyst components attrit forming fines. While formation of fines generally is considered undesirable, formation of particles less than 2.6 microns (microfines) is considered particularly undesirable as these can lead to operational problems in some FCC units while fines less than 2 microns can be important contributors to stack opacity problems. The formation of attrition resistant active components and additives is, thus, important in reducing fines formation. The addition of active zeolites, such as zeolite Y or ZSM-5 into an attrition-resistant kaolin-containing microspheres is accordingly desirable.

An active catalytic zeolite such as ZSM-5 can be incorporated into the kaolin slurry by mixing therewith an aqueous slurry of the zeolite catalyst. While ZSM-5 is preferred, other known shape-selective zeolites useful for FCC are known and are characterized by an intermediate pore size (e.g., pore size of from about 4 to about 7 angstroms). Besides ZSM-5, ZSM-11 can also be used. Methods for preparing the intermediate pore ZSM zeolite catalysts are well known in the art. Both organic templated and untemplated ZSM-5 are useful in this invention. Organic templated ZSM-5 treated in accordance with this invention has been found to improve propylene yield. The ZSM-5 catalyst is preferably prepared in an aqueous slurry containing from 10-40% by weight solids. Sufficient ZSM-5 is provided to yield a microsphere that contains at least 25 wt. % of the catalytic active component. Amounts of at least 30 wt. % are preferred.

In accordance with the invention, prior to incorporation with a kaolin slurry, the ZSM-5 zeolite is treated with a phosphorus containing compound (phosphoric acid or ammonium phosphate). For example, 2 to 10 weight %, preferably 4 to 6 weight % $P_2O_5$ on ZSM-5 is prepared by mixing ZSM-5 with a solution of a phosphorus compound. The mixture is then spray dried, followed by a mild calcination below 650° C., preferably in the presence of steam. The P treated ZSM-5 is made into a 30 to 45 weight % aqueous slurry, passed through a media mill until 90% of the particles are less than 3 microns. The attrition resistant ZSM-5 additive is prepared by mixing the P treated ZSM-5 slurry with a hydrous kaolin slurry having a solids content of 60-75%, and preferably, a mixture of aluminas, including alpha alumina and dispersed boehmite. This slurry mixture can then be spray dried with the addition of phosphoric acid or ammonium phosphate solution (20-30 wt. % concentration) via an in-line mixer just prior to entering the spray dryer with a contact time of the phosphoric acid and kaolin/ P-ZSM-5 zeolite/aluminas of less than 20 seconds. Likewise, the kaolin-containing slurry can be mixed thoroughly with the slurry of ZSM-5, alumina and phosphorus compounds prior to spray drying for several minutes or more. The final ZSM-5 additive has a typical composition of 25 to 50 weight % ZSM-5; 10-15 weight % $P_2O_5$; 12-25 weight % alumina; 20-35 weight % kaolin.

Prior to mixing the P-treated ZSM-5 slurry with the kaolin slurry, it is preferred to add the reactive alumina and other high density inorganic components into the P-ZSM-5 slurry. The high density component can be characterized as an inactive component and have a low BET surface area and high density. Typically, the inorganic component which is added to the catalytic slurry will have a BET surface area of less than 50 $m^2/g$ and a density greater than 2.8 g/cc. Preferably the high density unreactive component will have a BET surface area less than 25 $m^2/g$ and a density greater than 3.0 g/cc. Most preferably the high density unreactive component will have a BET surface area less than 25 $m^2/g$ and a density greater than 3.5 g/cc. By density it is meant the solid or crystal density of the solid material excluding pores having a diameter of greater than 20 angstroms. Examples of the inactive components include alpha-alumina and inorganic oxides or silicates such as zirconia, titania, zirconium silicate, mullite, metal carbides such as silicon carbide, metal nitrides such as silicon nitride, and other inorganic materials which have the desired low surface area and high density. Typically these materials can be added in solid form into the P-ZSM-5-containing slurry. Levels of the inactive component are such as to provide a final level of unreactive alumina or other unreactive component in the microsphere in amounts ranging from 3-25 weight %, more typically from about 4-10% by weight.

Also added to the microspheres of the present invention are reactive alumina species. These reactive alumina species are added to the P-ZSM-5 slurry and are characterized as having a total surface area (BET) of greater than 50 $m^2/g$. Preferably, reactive aluminas of much higher surface areas of from about 140 to 400 $m^2/g$ can be used. These reactive aluminas can typically include boehmite including dispersible boehmite (sometimes referred to as pseudoboehmite), gibbsite, and other transitional aluminas. Particularly useful is a dispersible boehmite which forms fine particles in acid such as formic acid or surfactants. Thus, the dispersible boehmite can be first dispersed in an aqueous solution of acid or surfactants and then added to the P-ZSM-5 catalyst slurry. Levels of the reactive high surface area alumina which can be added include levels that will provide from about 2-20 wt. % of the reactive alumina in the final microsphere. Typical amounts of the reactive alumina will range from 4-8 wt. %. The total weight of alumina, whether active or inactive, which can be added to and form part of the microsphere of this invention can range from at least 5 wt. % and typically will range from about 8-25 wt. %. A total alumina content, not including the alumina of the kaolin or the zeolite, in other words the amount of alumina in the form of added unreactive and reactive alumina, in amounts of greater than 10%, have been found most useful, including amounts from about 12-20 wt. %.

The phosphoric acid is preferably added to the mixed slurry as an aqueous solution. Thus, the phosphoric acid concentration can be from 5 to 40% by weight; 20 to 30% concentrations are preferred. Satisfactory results have been attained using sufficient phosphoric acid to produce products analyzing 5-25% $P_2O_5$, expressed on a volatile free weight basis. Microsphere products containing 10-15% $P_2O_5$ are typical.

Calcination can be carried out in a standard laboratory high temperature oven. Alternatively, the calcination can be carried out on a large scale in a rotary kiln or other commercial scale calciner.

The material is calcined at temperatures of from about 150° C.-815° C., with a range of 150° C.-680° C. preferred. Time at temperature is important only insofar as sufficient time must be provided for the entire mass being calcined to reach the desired calcination temperature. Thus, adequate heating can be accomplished in relatively short times provided samples are small.

An FCC catalyst (primary or additive) is added to an FCC process as a powder (20-200 microns) and generally is suspended in the feed and propelled upward in a reaction zone. A relatively heavy hydrocarbon feedstock, e.g., a gas oil, is admixed with a catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. After stripping entrained hydrocarbons from the spent catalyst, the catalyst is conveyed to a catalyst regenerator unit. The fluidizable catalyst is continuously circulated between the riser and the regenerator and serves to transfer heat from the latter to the former thereby supplying the thermal needs of the cracking reaction which is endothermic.

Gas from the FCC main-column overhead receiver is compressed and directed for further processing and separation to gasoline and light olefins, with $C_3$ and $C_4$ product olefins being directed to a petrochemical unit or to an alkylation unit to produce a high octane gasoline by the reaction of an isoparaffin (usually iso-butane) with one or more of the low molecular weight olefins (usually propylene and butylene). Ethylene would be recovered in a similar fashion and processed to additional petrochemical units.

The FCC conversion conditions include a riser top temperature of from about 500° C. to about 595° C., preferably from about 520° C. to about 565° C., and most preferably from about 530° C. to about 550° C.; catalyst/oil weight ratio of from about 3 to about 12, preferably from about 4 to about 11, and most preferably from about 5 to about 10; and catalyst residence time of from about 0.5 to about 15 seconds, preferably from about 1 to about 10 seconds.

The ZSM-5 catalyst of this invention is preferably used as an additive to the cracking processes which employ conventional large-pore molecular sieve component. The same applies for processes other than cracking processes. When used as an additive the catalyst of this invention is typically present in an amount between about 0.1% by weight and 30% by weight of the total catalyst inventory, and more typically in an amount between about 1% by weight and 15% by weight of the total. Cracking catalysts are large pore materials having pore openings of greater than about 7 Angstroms in effective diameter. Conventional large-pore molecular sieve include zeolite X (U.S. Pat. No. 2,882,442); REX; zeolite Y (U.S. Pat. No. 3,130,007); Ultrastable Y (USY) (U.S. Pat. No. 3,449,070); Rare Earth exchanged Y (REY) (U.S. Pat. No. 4,415,438); Rare Earth exchanged USY (REUSY); Dealuminated Y (DeAl Y) (U.S. Pat. Nos. 3,442,792 and 4,331,694); Ultrahydrophobic Y (UHPY) (U.S. Pat. No. 4,401,556); and/or dealuminated silicon-enriched zeolites, e.g., LZ-210 (U.S. Pat. No. 4,678,765). Preferred are higher silica forms of zeolite Y. ZSM-20 (U.S. Pat. No. 3,972,983); zeolite Beta (U.S. Pat. No. 3,308,069); zeolite L (U.S. Pat. Nos. 3,216,789 and 4,701,315); and naturally occurring zeolites such as faujasite, mordenite and the like may also be used (with all patents above in parentheses incorporated herein by reference). These materials may be subjected to conventional treatments, such as impregnation or ion exchange with rare earths to increase stability. In current commercial practice most cracking catalysts contain these large-pore molecular sieves. The preferred molecular sieve of those listed above is a zeolite Y, more preferably an REY, USY or REUSY. NaphthaMax® catalyst from BASF Corp. is a particularly suitable large pore catalyst. Methods for making these zeolites are known in the art.

Other large-pore crystalline molecular sieves include pillared silicates and/or clays; aluminophosphates, e.g., $AlPO_4$-5, $AlPO_4$-8, VPI-5; silicoaluminophosphates, e.g., SAPO-5, SAPO-37, SAPO-40, MCM-9; and other metal aluminophosphates. Mesoporous crystalline material for use as the molecular sieve includes MCM-41 and MCM-48. These are variously described in U.S. Pat. Nos. 4,310,440; 4,440,871; 4,554,143; 4,567,029; 4,666,875; 4,742,033; 4,880,611; 4,859,314; 4,791,083; 5,102,643; and 5,098,684, each incorporated herein by reference.

The large-pore molecular sieve catalyst component may also include phosphorus or a phosphorus compound for any of the functions generally attributed thereto, such as, for example, attrition resistance, stability, metals passivation, and coke make reduction.

EXAMPLES

Comparative Example 1

A ZSM-5 additive was prepared in a similar way as described in Example 1 of BASF patent U.S. Pat. No. 7,547,813. ZSM-5 having a $SiO_2/Al_2O_3$ molar ratio of 28 was slurried with water and milled to a particle size of 90% <3 micron to obtain ~30 wt. % solids slurry. The ZSM-5 additive was prepared by mixing a 70 wt. % hydrous kaolin slurry with a 30 wt. % ZSM-5 slurry and a mixture of aluminas, including alpha alumina and dispersed boehmite. This mixture was then spray dried with addition of phosphoric acid (28 wt. %) via an in-line mixer just prior to entering the spray dryer. The contact time of the phosphoric acid and kaolin/ZSM-5 zeolite/aluminas is typically less than 20 seconds. The additive was then calcined at 677° C. for 2 hours. The spray dried and calcined additive had a composition as listed in Table 1.

Example 1

The purpose of this example is to illustrate that the P treated ZSM-5 preparation provides a ZSM-5 additive with increased propylene yield for petrochemical FCC process.

5.5 wt. % $P_2O_5$ on ZSM-5 having a $SiO_2/Al_2O_3$ molar ratio of 28 was prepared by mixing ZSM-5 with an aqueous solution of phosphoric acid. The mixture was then spray dried, followed by a mild calcination at 593° C. for 40 min in the presence of 25% steam. The P treated ZSM-5 was made into a 30 wt. % aqueous slurry, passed through a media mill until 90% of the particles are less than 3 microns. The ZSM-5 additive was prepared by mixing the P treated ZSM-5 with hydrous kaolin and a mixture of aluminas, including alpha alumina and dispersed boehmite. This slurry mixture was then spray dried with addition of 28 wt. % phosphoric acid via an in-line mixer just prior to entering the spray dryer with a contact time of the phosphoric acid and kaolin/P-ZSM-5 zeolite/aluminas in less than 20 seconds. The additive was then calcined at 677° C. for 2 hours. The final ZSM-5 additive had a composition (wt. %) listed in Table 1.

TABLE 1

| Additive composition (wt. %) | | |
| --- | --- | --- |
| | Comparative Example (1) (wt. %) | Example (1) (wt. %) |
| ZSM-5, | 40 | 40 |
| Total $P_2O_5$, | 13.8 | 13.2 |
| Reactive $Al_2O_3$ | 6.5 | 6.5 |
| Alpha $Al_2O_3$ | 8.5 | 8.5 |
| Hydrous kaolin | 31.2 | 31.8 |

Example 2

The catalytic testing of the spray dried ZSM-5 additives described above was performed on an ACE™ fluidized-bed hydrocarbon cracking reactor using a gas oil feed. The catalyst was comprised of 76.5 wt. % FCC base catalyst and 23.5 wt. % ZSM-5 additive. Both the base catalyst and the ZSM-5 additive were steamed separately at 816° C. for 15 hr in 100% steam prior to testing. The results at a constant conversion of 70 wt. % are presented in Table 2 as wt. %. The results indicated that the additional P treatment of ZSM-5 enhances the activity and propylene yield for the additive with similar composition.

TABLE 2

| Catalytic Data (wt. %) at 70% Conversion | | |
| --- | --- | --- |
| | Comparative Example (1) (wt. %) | Example (1) (wt. %) |
| Ethylene | 2.60 | 2.79 |
| Propylene | 13.5 | 14.2 |
| Butenes | 11.9 | 12.5 |
| Total C2- | 3.65 | 3.73 |
| LPG | 31.8 | 33.5 |
| Gasoline | 32.0 | 30.4 |
| LCO | 19.2 | 19.1 |
| HCO | 10.8 | 10.9 |
| Coke | 2.52 | 2.42 |
| Cat/Oil | 8.00 | 7.71 |

Comparative Example 2

A ZSM-5 additive was prepared in a similar way as described in Comparative Example 1. The spray dried and calcined additive had a composition as listed in Table 3.

Example 3

The purpose of this example is to illustrate that a small crystal organic template and P treated ZSM-5 preparation provides a ZSM-5 additive with increased propylene yield for petrochemical FCC process.

4.7 wt. % $P_2O_5$ on templated, small crystal ZSM-5 having a $SiO_2/Al_2O_3$ molar ratio of 25 was prepared by mixing an aqueous solution of diammonium phosphate with the ZSM-5 that still contained an organic template. The mixture was then spray dried, followed by calcination. The calcination included ramping from ambient temperature to 350° C. in 1 hr. followed by a 1 hr. soak at 350° C., then ramping to 550° C. in one hour followed by a 2 hr. soak at 550° C. The P treated ZSM-5 was made into a 30 wt. % aqueous slurry, passed through a media mill until 90% was less than 3 microns. The ZSM-5 additive was prepared by mixing the P treated ZSM-5 with hydrous kaolin and a mixture of aluminas, including alpha alumina and dispersed boehmite. This slurry mixture was then spray dried with addition of 28 wt. % phosphoric acid via an in-line mixer just prior to entering the spray dryer with a contact time of the phosphoric acid and kaolin/P-ZSM-5 zeolite/aluminas of less than 20 seconds. The additive was then calcined at 677° C. for 2 hours. The final ZSM-5 additive had a composition (wt. %) listed in Table 3.

TABLE 3

Additive composition (wt. %)

| | Comparative Example (2) (wt. %) | Example (3) (wt. %) |
|---|---|---|
| ZSM-5, | 40 | 40 |
| Total $P_2O_5$, | 12.5 | 12.8 |
| Reactive $Al_2O_3$ | 6.5 | 6.5 |
| Alpha $Al_2O_3$ | 8.5 | 8.5 |
| Hydrous kaolin | 32.5 | 32.2 |

Example 4

The catalytic testing of the spray dried ZSM-5 additives described above was performed on an ACE™ fluidized-bed hydrocarbon cracking reactor using a gas oil feed. The catalyst was comprised of 85 wt. % FCC base catalyst, 5 wt. % ZSM-5 additive and 10% inert kaolin microspheres. The base catalyst was steam deactivated for 24 hr. at 788° C. in 100% steam and the ZSM-5 additive at 816° C. for 15 hr in 100% steam prior to testing. The results at a constant conversion of 75 wt. % are presented in Table 4 as wt. %. The results indicated that the additional P treatment of ZSM-5 enhances the activity and propylene yield for the additive with similar composition.

TABLE 4

Catalytic Data (wt. %) at 75% Conversion

| | Comparative Example (2) (wt. %) | Example (3) (wt. %) |
|---|---|---|
| Ethylene | 1.24 | 1.46 |
| Propylene | 11.8 | 13.1 |
| Butenes | 11.5 | 11.8 |
| Total C2- | 2.69 | 2.86 |
| LPG | 29.9 | 32.1 |
| Gasoline | 40.3 | 37.9 |
| LCO | 17.6 | 17.6 |
| HCO | 7.40 | 7.40 |
| Coke | 2.10 | 2.10 |
| Cat/Oil | 9.30 | 8.83 |

Comparative Example 3

ZSM-5 having a $SiO_2/Al_2O_3$ molar ratio of 28 was slurried with water and milled to a particle size of 90% <3 micron to obtain ~30 wt. % solids slurry. The ZSM-5 additive was prepared by mixing 70 wt. % hydrous kaolin slurry with a 30 wt. % ZSM-5 slurry and a mixture of aluminas, including alpha alumina and dispersed boehmite. This mixture was thoroughly mixed with phosphoric acid (28 wt. %) before spray drying. The contact time of the phosphoric acid and kaolin/ZSM-5 zeolite/aluminas varies from several minutes to an hour, depending on the mixing efficiency. The additive was then calcined at 677° C. for 2 hours. The spray dried and calcined additive had a composition as listed in Table 5.

Examples 5A and 5B

The purpose of these examples are to illustrate that another P treated (with either phosphoric acid or diammonium phosphate) ZSM-5 preparation without in-line phosphoric acid injection provides a ZSM-5 additive with increased propylene yield for petrochemical FCC process.

4.8 and 4.4 wt. % $P_2O_5$ on ZSM-5 zeolite, having a $SiO_2/Al_2O_3$ molar ratio of 28, were prepared by mixing with an aqueous solution of phosphoric acid or diammonium phosphate, respectively. The mixture was then spray dried, followed by a mild calcination at 500° C. for 2 hr. in the presence of 15% steam. The P treated ZSM-5 was made into a 30 wt. % aqueous slurry, passed through a media mill until 90% is less than 3 microns. The ZSM-5 additive was prepared by mixing the P treated ZSM-5 with hydrous kaolin and a mixture of aluminas, including alpha alumina and dispersed boehmite. This mixture was thoroughly mixed with phosphoric acid (28 wt. %) before spray drying. The contact time of the phosphoric acid and kaolin/P-ZSM-5 zeolite/aluminas varies from several minutes to an hour, depending on the mixing efficiency. The additive was then calcined at 677° C. for 2 hours. The final ZSM-5 additive had a composition (wt. %) listed in Table 5.

TABLE 5

Additive composition (wt. %)

| | Comparative Example (3) (wt. %) | Example (5A) (wt. %) | Example (5B) (wt. %) |
|---|---|---|---|
| ZSM-5, | 40 | 40 | 40 |
| Total $P_2O_5$, | 12.9 | 12.9 | 12.9 |
| Reactive $Al_2O_3$ | 7.5 | 7.5 | 7.5 |
| Alpha $Al_2O_3$ | 7.5 | 7.5 | 7.5 |
| Hydrous kaolin | 32.1 | 32.1 | 32.1 |

Example 6

The catalytic testing of the spray dried ZSM-5 additives described above was performed on an ACE™ fluidized-bed hydrocarbon cracking reactor using a gas oil feed. The catalyst was comprised of 85 wt. % FCC base catalyst, 5 wt. % ZSM-5 additive and 10% inert kaolin microspheres. The base catalyst was steam deactivated for 24 hr. at 788° C. in 100% steam and the ZSM-5 additive at 816° C. for 15 hr in 100% steam prior to testing. The results at a constant conversion of 75 wt. % are presented in Table 6 as wt. %. The results indicated that the additional P treatment of ZSM-5 enhances the activity and propylene yield for the additive with similar composition.

TABLE 6

Catalytic Data (wt. %) at 75% Conversion

|  | Comparative Example (3) (wt. %) | Example (5A) (wt. %) | Example (5B) (wt. %) |
|---|---|---|---|
| Ethylene | 1.07 | 1.23 | 1.18 |
| Propylene | 10.5 | 11.5 | 11.1 |
| Butenes | 10.9 | 11.0 | 11.1 |
| Total C2- | 2.46 | 2.61 | 2.59 |
| LPG | 28.0 | 29.3 | 29.0 |
| Gasoline | 42.0 | 40.6 | 40.9 |
| LCO | 17.8 | 17.7 | 17.8 |
| HCO | 7.20 | 7.30 | 7.20 |
| Coke | 2.55 | 2.55 | 2.53 |
| Cat/Oil | 8.34 | 8.22 | 8.27 |

The invention claimed is:

1. A process for producing a first attrition resistant catalyst, the process comprising:
   i) mixing a first ZSM-5 zeolite with a first aqueous phosphorus-containing solution so as to form a phosphorus-treated ZSM-5 zeolite having from 2 wt. % to 6 wt. % $P_2O_5$ incorporated therein;
   ii) spray-drying the phosphorus-treated ZSM-5 zeolite to form a spray-dried, phosphorus-treated ZSM-5 zeolite;
   iii) calcining the spray-dried, phosphorus-treated ZSM-5 zeolite at a first temperature below 650° C. to form a calcined, phosphorus-treated ZSM-5 zeolite;
   iv) mixing a first aqueous slurry of the calcined, phosphorus-treated ZSM-5 zeolite with a second aqueous slurry comprising alumina and kaolin to form a slurry mixture, wherein the first aqueous slurry has a first solids content of 30-45 wt. %, the first aqueous slurry having been milled until at least 90% of particles of the first aqueous slurry are less than 3 microns;
   v) spray-drying the slurry mixture with a second aqueous phosphorus-containing solution into microspheres having a size of from about 20 to 200 microns, wherein the second aqueous phosphorus-containing solution is added to the slurry mixture prior to entering a spray dryer such that a contact time of the second aqueous phosphorus-containing solution and the slurry mixture is less than 20 seconds;
   vi) calcining the microspheres at a second temperature from 150° C. to 815° C., wherein the microspheres contain about 10-25 wt. % $P_2O_5$; and
   vii) combining between about 0.1 wt % and 30 wt % of the microspheres, based on total weight of the first attrition resistant catalyst, with a FCC base catalyst to form the first attrition resistant catalyst, wherein the FCC base catalyst comprises pore openings of greater than about 7 angstroms, wherein a first propylene yield, at 75% conversion, of the first attrition resistant catalyst prepared according to i) through vii) is greater than a second propylene yield of a second attrition resistant catalyst prepared according to iv) through vii) with iv) referring to a second ZSM-5 zeolite that was not subjected to i) through iii).

2. The process of claim 1, wherein the iii) calcining of the spray-dried, phosphorus-treated ZSM-5 zeolite is at the first temperature from 350° C. to 650° C. in presence of 15-25% steam to form the calcined, phosphorus-treated ZSM-5 zeolite, and wherein the second temperature is from 150° C. to 680° C.

3. The process of claim 1, wherein the microspheres contain at least 25 wt. % of the first ZSM-5 zeolite.

4. The process of claim 1, wherein the i) mixing of the first ZSM-5 zeolite with the first aqueous phosphorus-containing solution is to incorporate from 4 wt. % to 6 wt. % $P_2O_5$ therein, and wherein the microspheres contain 10-15 wt. % $P_2O_5$.

5. The process of claim 2, wherein the slurry mixture is further formed by adding, a high density component to the first aqueous slurry, the high density component having a density greater than 2.8 g/cc.

6. The process of claim 5, wherein the high density component has a first BET surface area of less than 50 $m^2/g$.

7. The process of claim 5, wherein the slurry mixture is further formed by adding a reactive alumina species to the first aqueous slurry, the reactive alumina species having a second BET surface area of greater than 50 $m^2/g$.

8. The process of claim 7, wherein the second BET surface area is from about 140 to 400 $m^2/g$.

9. The process of claim 7, wherein the reactive alumina species is a transitional alumina.

10. The process of claim 1, wherein at least one of the first aqueous phosphorus-containing solution or the second aqueous phosphorus-containing solution is phosphoric acid or ammonium phosphate.

11. The process of claim 7, wherein each of the microspheres has a composition comprising 25 to 50 wt. % ZSM-5, 10 to 15 wt. % $P_2O_5$, 12 to 25 wt. % alumina, and 20 to 35 wt. % kaolin.

12. The process of claim 1, wherein the first ZSM-5 zeolite is an organic-templated ZSM-5 zeolite.

13. The process of claim 1, wherein the first ZSM-5 zeolite has a $SiO_2/Al_2O_3$ molar ratio from 25 to 28.

14. The process of claim 1, wherein the slurry mixture is further formed by adding a mixture of aluminas comprising alpha alumina and dispersed boehmite to the first aqueous slurry.

15. The process of claim 1, wherein the second aqueous slurry has a second solids content of 60-75 wt. %.

16. The process of claim 1, wherein the first attrition resistant catalyst comprises 5 to 23.5 wt. % of the microspheres and up to 10 wt. % inert kaolin microspheres.

17. A process for producing a first attrition resistant catalyst additive in form of first microspheres having a size of from about 20 to 200 microns, wherein the first microspheres contain at least 25 wt. % of a first ZSM-5 zeolite and from 10 to 15 wt. % $P_2O_5$, the process comprising:
   i) mixing the first ZSM-5 zeolite with a first aqueous phosphorus-containing solution to form a phosphorus-treated ZSM-5 zeolite having from 4 wt. % to 6 wt. % $P_2O_5$ incorporated therein;
   ii) spray-drying the phosphorus-treated ZSM-5 zeolite to form a spray-dried, phosphorus-treated ZSM-5 zeolite;
   iii) calcining the spray-dried, phosphorus-treated ZSM-5 zeolite at a first temperature below 650° C. to form a calcined, phosphorus-treated ZSM-5 zeolite;
   iv) combining a first aqueous slurry of the calcined, phosphorus-treated ZSM-5 zeolite, a second aqueous slurry of kaolin, a high density component of greater than 2.8 g/cc, and a reactive alumina species having a BET surface area of greater than 50 $m^2/g$ to form a slurry mixture, wherein the first aqueous slurry has a first solids content of 30-45 wt. %, the first aqueous slurry having been milled until at least 90% of particles of the first aqueous slurry are less than 3 microns;
   v) spray-drying the slurry mixture with a second aqueous phosphorus-containing solution to form a spray-dried mixture, wherein the second aqueous phosphorus-containing solution is added to the slurry mixture prior to entering a spray dryer such that a contact time of the second aqueous phosphorus-containing solution and the slurry mixture is less than 20 seconds; and vi) calcining the spray-dried mixture at a second temperature from 150° C. to 680° C., wherein a greater propylene yield is exhibited by a first attrition resistant catalyst comprising the first microspheres prepared according to i) through vi) as compared to a propylene yield exhibited by a second attrition resistant catalyst comprising second microspheres prepared according to iv) through vi) with iv) referring to a second ZSM-5 zeolite that was not subjected to i) through iii), the first attrition resistant catalyst being a combination of between about 0.1 wt % and 30 wt % of the first microspheres and a FCC base catalyst having pore opening of greater than about 7 angstroms, wherein the wt % is based on total weight of the first attrition resistant catalyst.

18. A process for producing a first attrition resistant catalyst additive in form of first microspheres having a size of from about 20 to 200 microns, the process comprising:

i) treating an organic-templated ZSM-5 zeolite with a first aqueous phosphorus-containing solution to form a phosphorus-treated ZSM-5 zeolite having from 2 wt. % to 6 wt. % $P_2O_5$ incorporated therein;

ii) spray-drying the phosphorus-treated ZSM-5 zeolite to form a spray-dried, phosphorus-treated ZSM-5 zeolite;

iii) calcining the spray-dried, phosphorus-treated ZSM-5 zeolite at a first temperature below 650° C. to form a calcined, phosphorus-treated ZSM-5 zeolite;

iv) mixing a first aqueous slurry of the calcined, phosphorus-treated ZSM-5 zeolite, a second aqueous slurry of kaolin, and alumina to form a mixture, wherein the first aqueous slurry has a first solids content of 30-45 wt. %, the first aqueous slurry having been milled until at least 90% of particles of the first aqueous slurry are less than 3 microns;

v) spray-drying the mixture into the first microspheres, wherein a second aqueous phosphorus-containing solution is added to the mixture prior to entering a spray dryer such that a contact time of the second aqueous phosphorus-containing solution and the mixture is less than 20 seconds; and vi) calcining the first microspheres at a temperature from 150° C. to 815° C., wherein the first microspheres contain about 10-25 wt. % $P_2O_5$, wherein a greater propylene yield is exhibited by a first attrition resistant catalyst comprising the first microspheres prepared according to i) through vi) as compared to a propylene yield exhibited by a second attrition resistant catalyst comprising second microspheres prepared according to iv) through vi) with iv) referring to a second ZSM-5 zeolite that was not subjected to i) through iii), the first attrition resistant catalyst being a combination of between about 0.1 wt % and 30 wt % of the first microspheres and a FCC base catalyst having pore opening of greater than about 7 angstroms, wherein the wt % is based on total weight of the first attrition resistant catalyst.

* * * * *